(12) United States Patent
Prendes (10) Patent No.: US 7,757,639 B1
(45) Date of Patent: Jul. 20, 2010

(54) PET LEASH ASSEMBLY

(76) Inventor: Jodie Prendes, 3820 Golf Village Loop, Apt #4, Lakeland, FL (US) 33809

( * ) Notice: Subject to any disclaimer, the term of this patent is extended or adjusted under 35 U.S.C. 154(b) by 472 days.

(21) Appl. No.: 11/702,043

(22) Filed: Feb. 5, 2007

(51) Int. Cl.
*A01K 27/00* (2006.01)

(52) U.S. Cl. ..................................... 119/772

(58) Field of Classification Search ........... 119/769, 119/770, 771, 772, 777, 778, 779, 780, 781, 119/784, 785, 792, 795, 857, 863, 865; 403/379.5, 403/109.3, 109.6, 52; 24/612, 613, 115 F; 59/95

See application file for complete search history.

(56) References Cited

U.S. PATENT DOCUMENTS

| | | | |
|---|---|---|---|
| 4,879,972 A * | 11/1989 | Crowe et al. ............... | 119/792 |
| 5,901,668 A * | 5/1999 | Goodger, Sr. ............... | 119/795 |
| 6,273,029 B1 * | 8/2001 | Gish .......................... | 119/792 |
| 6,626,132 B1 * | 9/2003 | Mann ......................... | 119/795 |
| 7,389,750 B1 * | 6/2008 | Rogers et al. ............... | 119/792 |

FOREIGN PATENT DOCUMENTS

GB      2243895 A  * 11/1991

* cited by examiner

*Primary Examiner*—T. Nguyen (57) ABSTRACT

A pet leash assembly includes a primary leash with axially opposed looped ends, and a first ring member slidably conjoined to one of the looped ends. Auxiliary leashes including first and second locking members positioned at opposed ends thereof, and a second ring member are removably mated with a top one of the locking members of the auxiliary leashes. The auxiliary leashes are independently removable from the second ring member. A mechanism rotatably anchors the first and second ring members so that the auxiliary leashes remain spaced apart along unique travel paths while the pets cross over an adjoining one of the travel paths.

7 Claims, 10 Drawing Sheets

PET LEASH ASSEMBLY

CROSS REFERENCE TO RELATED APPLICATIONS

This application claims the benefit of U.S. Provisional Application No. 60/764,031, filed Feb. 2, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to leashes and, more particularly, to a pet leash assembly for simultaneously maintaining a plurality of pets at an untangled position during walking conditions.

2. Prior Art

America is a country of dog lovers. A favorite pastime enjoyed by many dog owners, as well as their pets, is taking a leisurely or fast paced walk. Breathing in the fresh air, stretching the body with some light exercise, and enjoying the sites and sounds of new surroundings, taking an outdoor walk can be a revitalizing experience for both the animal and the owner. Typically, most dogs, regardless if whether an expensive thoroughbred purchased from a topnotch breeder, or a mixed breed mutt picked up at the local pound, love going for walks. Not surprisingly, many dog owners report that their pets instinctively run for the door as soon as they see that the master has grabbed the leash.

As pleasant as a walk can be for both the dog and the owner, those who own multiple dogs often find that the task of walking all of them at one time can be a challenge. Particularly, juggling several leashes at once can result in the restraints becoming twisted and tangled together. This often occurs when the animals cross each other's path, resulting in the leashes becoming hopelessly tangled. Frustrating and time consuming, owners must continuously stop the walk in order to free the snarled mess. Additionally, when using multiple leashes, an owner is frequently pulled in opposite directions as dogs are attracted to various sites and smells. This constant tugging of the arms can be very uncomfortable for dog walkers, especially while walking large breeds. Moreover, becoming tightly wrapped within the straps of the leashes can be an uncomfortable experience for the dogs. As dogs can be excited and active while on a walk, there is the risk that the walker will accidentally lose the grip on the leash. As a result, the freed pet could run headlong into traffic.

One prior art example shows a retractable leash assembly structured to facilitate quick connection of at least one animal to at least one lead interconnected at a proximal end to an activation assembly and to a quick connect coupling assembly at a distal end. The quick connect coupling assembly includes an electromotive release mechanism structured to permit removable connection of a collar, harness, or similar attachment assembly to the distal end of the lead. Upon actuation of the electromotive release mechanism, the components of the quick release coupling assembly are disposed into a release orientation such that the components are detached from one another. The quick connect coupling assembly may also include an electromotive propulsion mechanism structured to selectively impart a separation force between the components of the coupling assembly to facilitate detachment of the components from one another. Unfortunately, this prior art example is not designed to allow the simultaneous connection of more than one animal to the leash, and includes complicated electronic components that may become damaged or inoperable, thus rendering the device useless for its intended purpose.

Another prior art example shows a pet leash for walking two pets such as dogs, together without tangling. It is great for training your pets to walk on a leash. This invention is durable and made in many colors and sizes. Made with nylon strapping, the leash has a handle at one end and a metal ring at the other end. Machine sewn, this leash is removable with another piece of nylon strapping. At one end there is a swivel snap or equivalent that is sewn for security, then a colorful hollow rod is slid onto the strapping next to the swivel snap. Then another swivel snap is slid onto the strapping then another colorful hollow rod is slid onto the strapping, then the final swivel snap is sewn to the end of the strapping for security. Unfortunately, this prior art example shows secondary leashes being attached in pairs, as opposed to singly, requiring even numbers of pets be attached to the primary leash.

Accordingly, a need remains for a pet leash assembly in order to overcome the above-noted shortcomings. The present invention satisfies such a need by providing an assembly that is convenient and easy to use, is lightweight yet durable in design, and allows a user to simultaneously maintain a plurality of pets at an untangled position during walking conditions. Such an assembly allows consumers to effortlessly walk two or more dogs with one leash.

The leash features several leashes attached to one handle, and comfortably accommodates pets of the same or varying heights, while simultaneously preventing the pets from crossing paths. As all leashes are connected to one central handle, the user can easily control all the pets connected thereto. The assembly eliminates the need to continuously interrupt a walk to untangle leashes. This also prevents pets from becoming injured or hurt as a result of getting wrapped up or tangled in the leashes. The present invention is simple to use, inexpensive, and designed for many years of repeated use.

BRIEF SUMMARY OF THE INVENTION

In view of the foregoing background, it is therefore an object of the present invention to provide an assembly for a pet leash assembly. These and other objects, features, and advantages of the invention are provided by a pet leash assembly for simultaneously maintaining a plurality of pets at an untangled position during walking conditions.

The assembly includes a primary leash that has axially opposed looped ends, and a first ring member slidably conjoined directly to one of the looped ends. The opposite looped end forms a handle that is suitable for gripping by a user hand. The assembly further includes a plurality of auxiliary leashes including first and second locking members conveniently positioned at opposed ends thereof, and a second ring member directly and removably mated with a top one of the locking members associated with each of the auxiliary leashes. Such auxiliary leashes are independently removable from the second ring member while the locking members advantageously remain spaced from the first ring member during walking conditions. Such a second ring member is freely rotatable along clockwise and counter clockwise directions effectively defined about a fulcrum axis advantageously extending parallel to a longitudinal length of the primary leash.

The assembly further includes, in a preferred embodiment, a mechanism for rotatably anchoring the first and second ring members in such a manner that the auxiliary leashes advantageously remain spaced apart along unique travel paths while the pets cross over an adjoining one of the travel paths during walking conditions. Such a rotatable anchoring mechanism includes a female coupling that has a distal end concentrically mated to the second ring member, and a hollow chamber with a smooth interior surface formed at a proximal end thereof. A male coupling is directly mated to the first ring member and extends distally away therefrom. The male coupling has a spherical distal end freely and rotatably seated within the chamber and cooperating therewith such that the female coupling effectively glides about the spherical end of the male coupling while the first ring member advantageously remains statically aligned at a fixed position with the primary leash.

The rotatable anchoring mechanism further includes, in an alternate embodiment, a first male coupling that has a spherical proximal end, and further has a hollow distal end slidably positioned along the second ring member. An intermediately disposed female coupling has a spherical and hollow distal end rotatably positioned about the spherical end of the first male coupling such that the first male coupling and the female coupling are freely rotatable about each other. The female coupling further has a chamfered proximal end effectively defining a linear groove therein. A second male coupling is slidably positional along the first ring member and conveniently includes a linear insert removably interfitted within the linear groove of the female coupling.

The second male coupling further includes a detent formed within the second male coupling. The female coupling includes an aperture formed at a top surface thereof, and the detent is aligned with the aperture such that the female coupling and the second male coupling advantageously remain statically and fixedly confronted while the first male coupling freely rotates within the hollow distal end of the female coupling. The male and female couplings are slidably positional along a circumference of the first and second ring members respectively.

A method for simultaneously maintaining a plurality of pets at an untangled position during walking conditions includes the steps of providing a primary leash that has axially opposed looped ends, providing a first ring member slidably conjoined directly to one of the looped ends, providing a plurality of auxiliary leashes including first and second locking members positioned at opposed ends thereof, directly and removably mating a second ring member with a top one of the locking members associated with each of the auxiliary leashes, and rotatably anchoring the first and second leashes in such a manner that the auxiliary leashes remain spaced apart along unique travel paths while the pets cross over an adjoining one of the travel paths during walking conditions. The auxiliary leashes are independently removable from the second ring member while the locking members remain spaced from the first ring member during walking conditions. The second ring member is freely rotatable along clockwise and counter clockwise directions defined about a fulcrum axis extending parallel to a longitudinal length of the primary leash.

The method further includes, in a preferred embodiment, the steps of providing a female coupling that has a distal end concentrically mated to the second ring member. Such a female coupling has a hollow chamber formed at a proximal end thereof and has a smooth interior surface. The steps further include providing a male coupling directly mated to the first ring member and extending distally away therefrom. Such a male coupling has a spherical distal end freely and rotatably seated within the chamber and cooperating therewith such that the female coupling glides about the spherical end of the male coupling while the first ring member remains statically aligned at a fixed position with the primary leash.

The method further includes, in an alternate embodiment, the steps of providing a first male coupling that has a spherical proximal end and further has a hollow distal end slidably positioned along the second ring, providing an intermediately disposed female coupling that has a spherical and hollow distal end rotatably positioned about the spherical end of the first male coupling such that the first male coupling and the female coupling are freely rotatable about each other, and providing a second male coupling slidably positional along the first ring member and including a linear insert removably interfitted within the linear groove of the female coupling. The female coupling further has a chamfered proximal end defining a linear groove therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-10 by the reference numeral 10 and 10' and is intended to provide a pet leash assembly. It should be understood that the assembly 10 and 10' may be used to walk many different types of animals and should not be limited in use to walking only those types of animals described herein.

Referring to FIGS. 1, 2, 3, 5, 6, 7, 8 and 9, the assembly 10 and 10' includes a primary leash 20 that has axially opposed looped ends 21, and a first ring member 22 slidably conjoined directly to one of the looped ends 21, without the use of intervening elements. The opposite looped end 21 forms a handle 50 that is suitable for gripping by a user hand. The assembly 10 and 10' further includes a plurality of auxiliary leashes 23 including first 24 and second 25 locking members positioned at opposed ends 26 thereof, and a second ring member 27 directly and removably mated with a first one 24 of the locking members 24, 25 associated with each of the auxiliary leashes 23, without the use of intervening elements. A second one 25 of the locking members 24, 25 is used for attaching an auxiliary leash 23 to a pet collar 12, which is essential for securing the animal 11 to the primary leash 20 during walking conditions.

Such auxiliary leashes 23 are independently removable from the second ring member 27 while the locking members 24, 25 advantageously remain spaced from the first ring member 22 during walking conditions, which allows a user to attach or detach any number of pets 11 as desired. Such a second ring member 27 is freely rotatable along clockwise and counter clockwise directions defined about a fulcrum axis 30 advantageously extending parallel to a longitudinal length of the primary leash 20. The free movement of the second ring member 27 prevents the auxiliary leashes 23 from becoming tangled during walking conditions, and makes it easier for a user to attach or detach pets 11 as desired. This allows the pets 11 to have freedom of movement during a walk without causing dangerous or uncomfortable positions for the user or the pets 11.

Referring to FIGS. 1, 3, 4, 5 and 6, the assembly 10 further includes, in a preferred embodiment, a mechanism 31 for rotatably anchoring the first and second ring members 22, 27, which is critical such that the auxiliary leashes 23 advantageously remain spaced apart along unique travel paths while the pets 11 cross over an adjoining one of the travel paths during walking conditions. Such a rotatable anchoring mechanism 31 includes a female coupling 32 that has a distal end 33 concentrically mated to the second ring member 27, and a hollow chamber 34 with a smooth interior surface formed at a proximal end 35 thereof.

A male coupling 36 is directly mated to the first ring member 22, without the use of intervening elements, and extends distally away therefrom. The male coupling 36 has a spherical distal end 37 freely and rotatably seated within the chamber 34 and cooperating therewith, which is crucial such that the female coupling 32 glides about the spherical end 37 of the male coupling 36 while the first ring member 22 advantageously remains statically aligned at a fixed position with the primary leash 20. This allows the user to have control over the primary leash 20, and simultaneously over the auxiliary leashes 23, while the second ring member 27 spins freely about the male coupling 36 and allows the pets 11 to have unencumbered freedom of movement during walking conditions Referring to FIGS. 7, 8, 9 and 10, the rotatable anchoring mechanism 31', in an alternate embodiment, further includes a first male coupling 36' that has a spherical proximal end 38', and further has a hollow distal end 39 slidably positioned along the second ring member 27. An intermediately disposed female coupling 32' has a spherical and hollow distal end 33' rotatably positioned about the spherical end 38' of the first male coupling 36', which is vital such that the first male coupling 36' and the female coupling 32' are freely rotatable about each other. The female coupling 32' further has a chamfered proximal end 40 defining a linear groove 41 therein. A second male coupling 42 is slidably positional along the first ring member 22 and includes a linear insert 43 removably interfitted within the linear groove 41 of the female coupling 32'. The free rotation of the second ring member 27 prevents impeded motion of the second ring member 27 along a travel path and allows the invention to function as intended.

Figure 1:
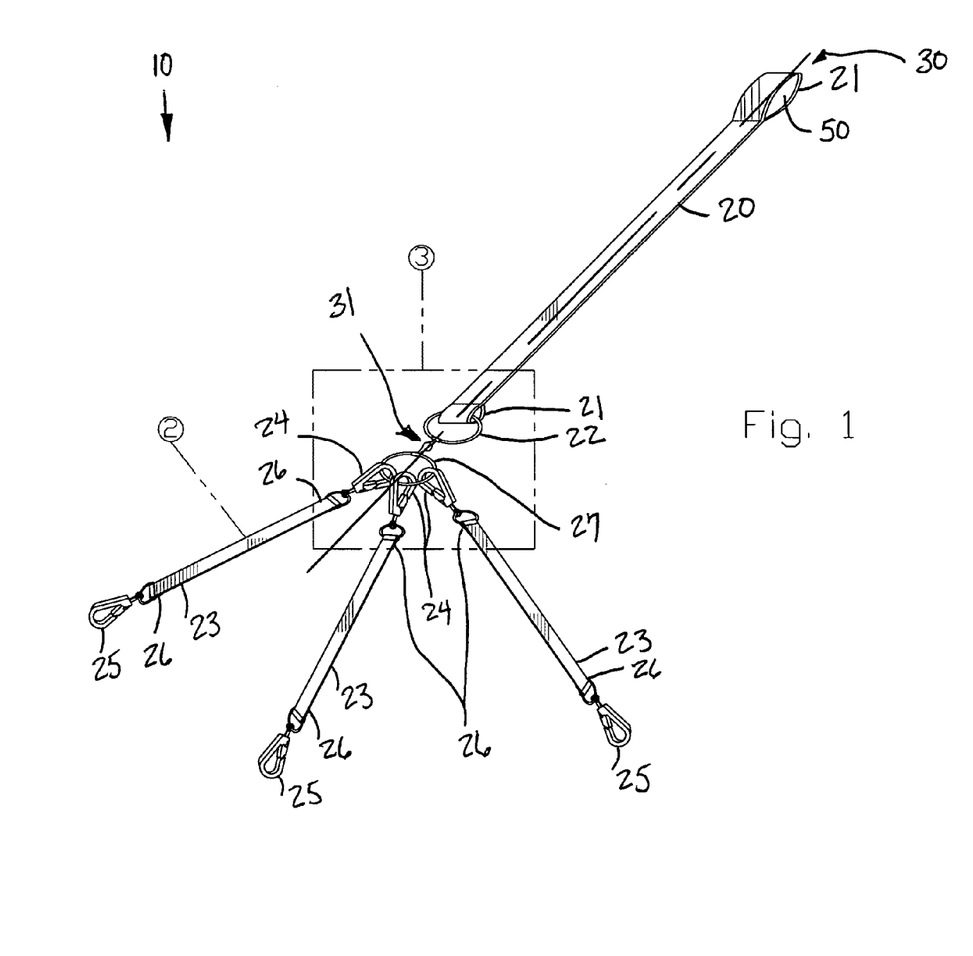
FIG. 1 is a perspective view of a pet leash assembly showing the auxiliary leashes attached to the primary leash, in accordance with the present invention.
Figure 2:
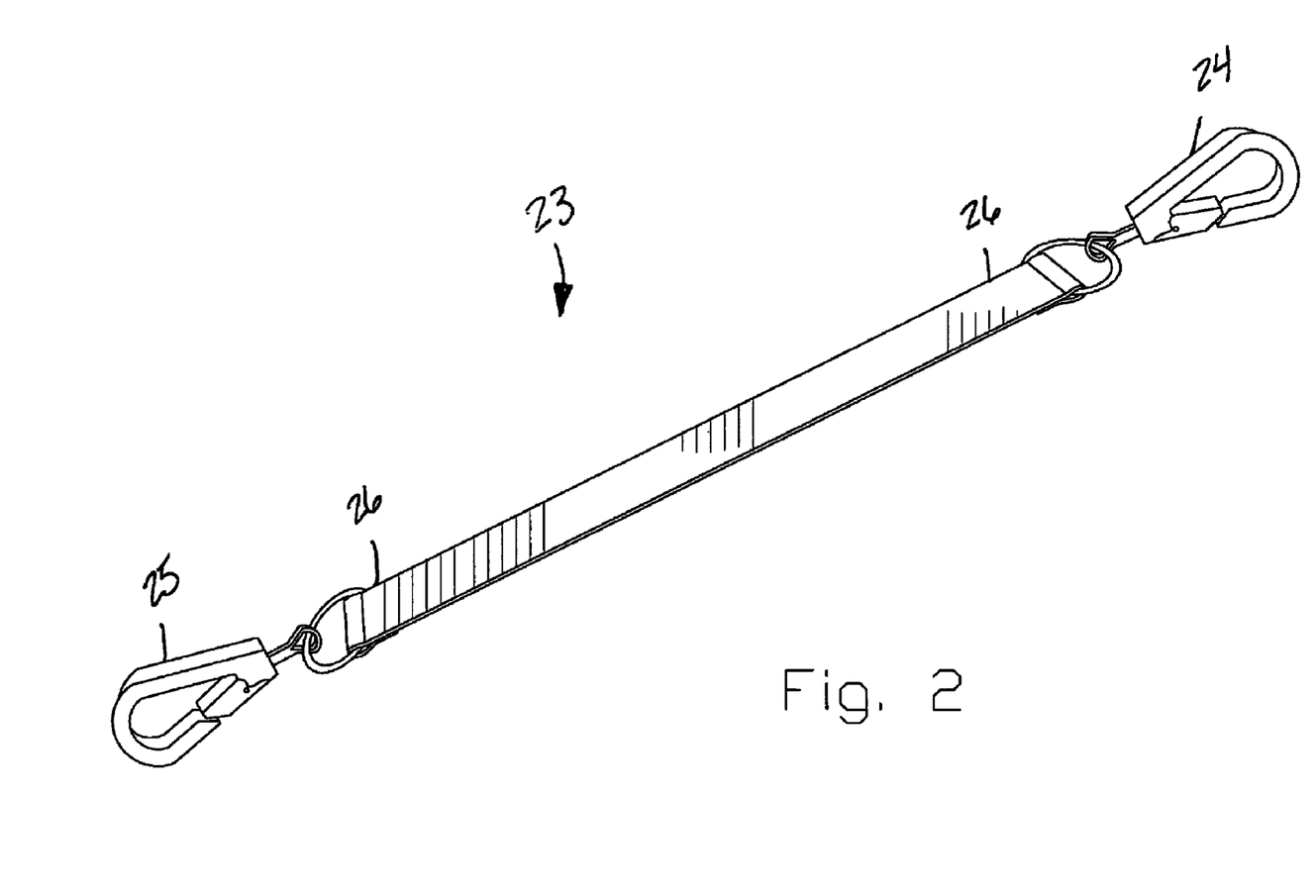
FIG. 2 is a perspective view of an auxiliary leash.
Figure 3:
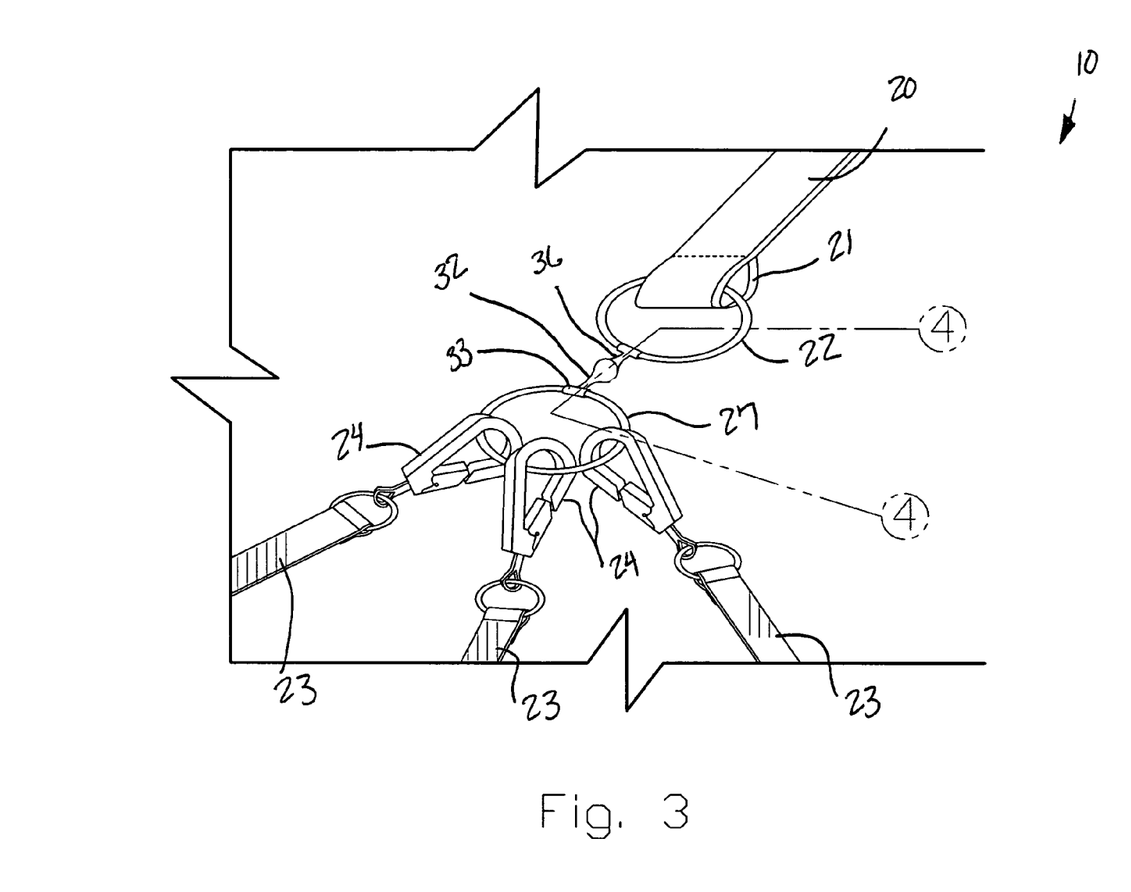
FIG. 3 is an expanded view of the first and second ring members respectively.
Figure 4:
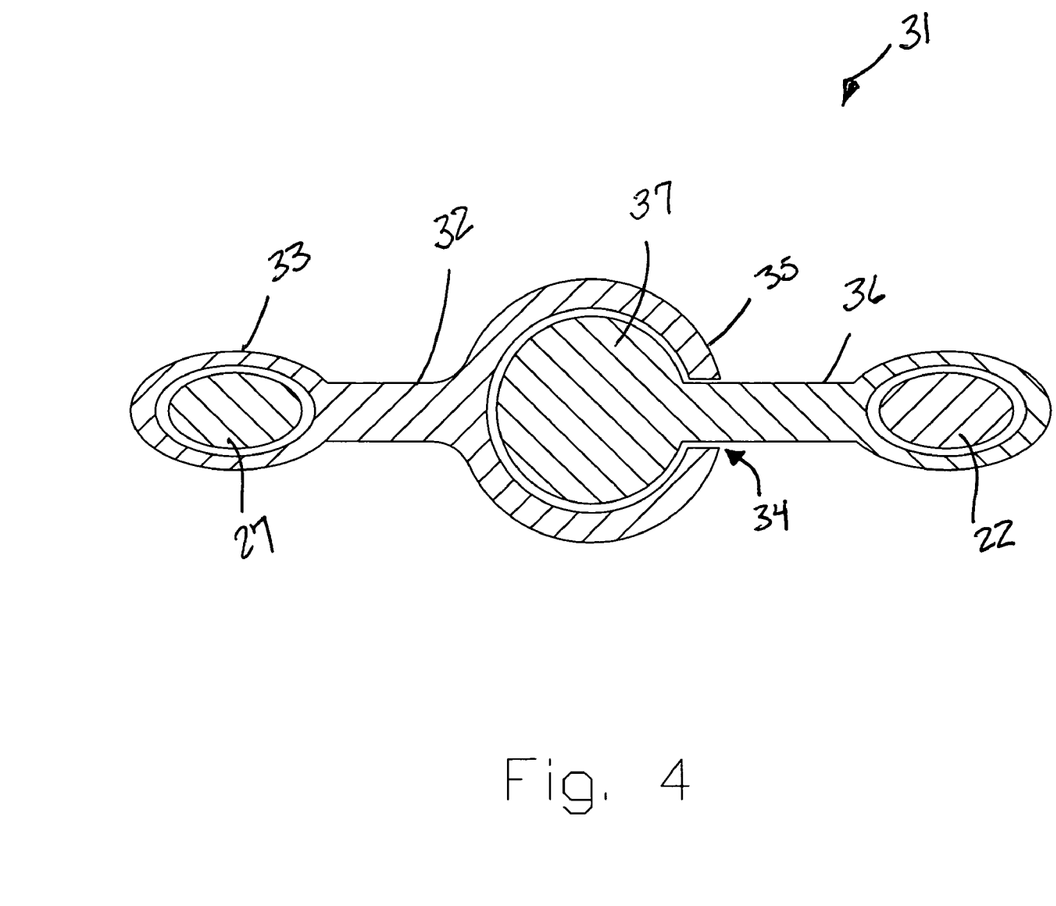
FIG. 4 is a cross sectional view of the first and second rings shown in FIG. 3, taken along line 4-4.
Figure 5:
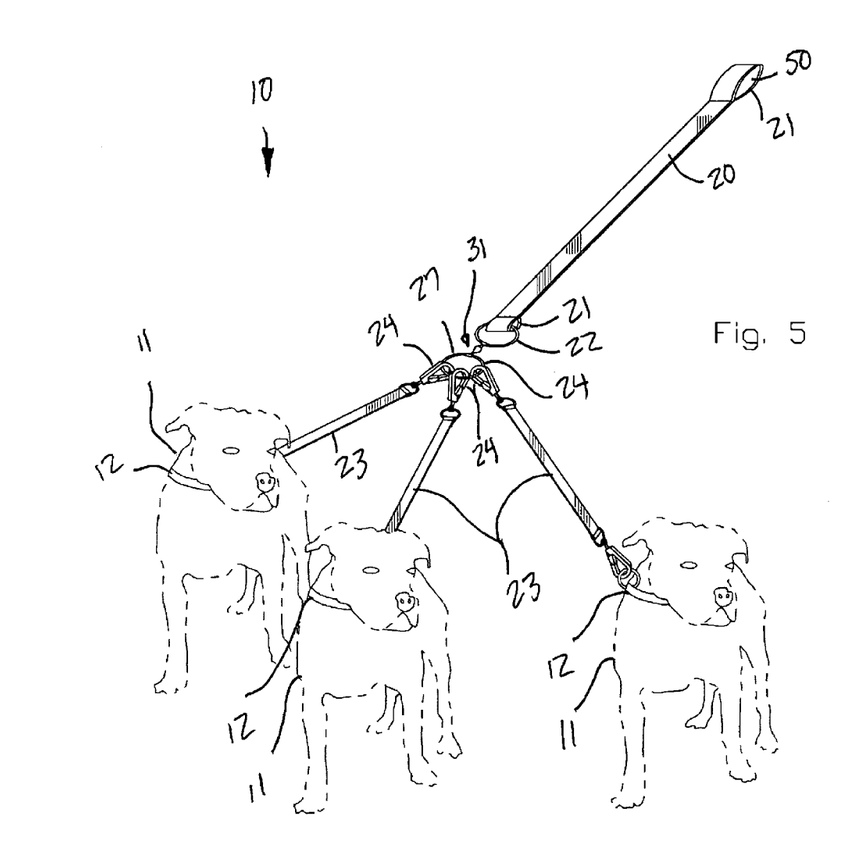
FIG. 5 is a perspective view of the assembly shown in FIG. 1, showing pets attached thereto.
Figure 6:
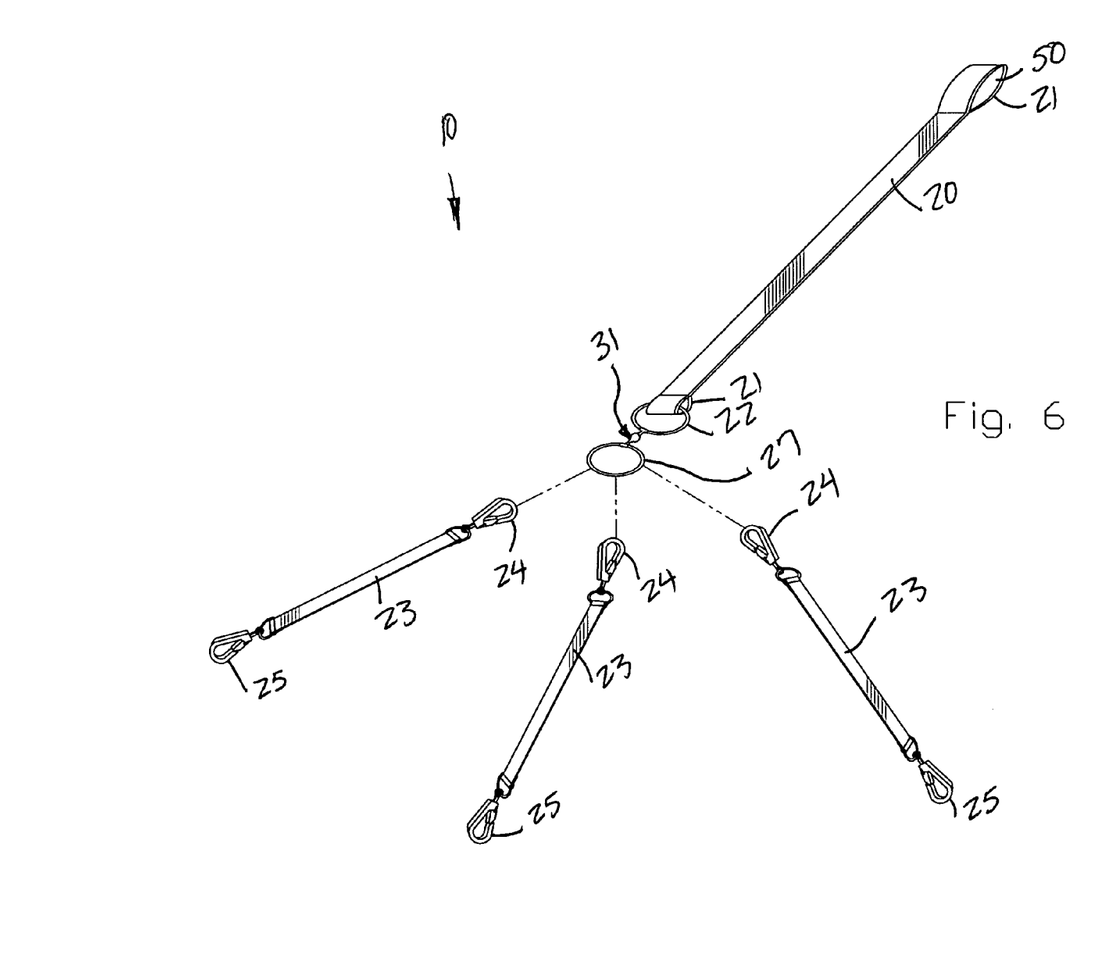
FIG. 6 is a perspective view of the assembly shown in FIG. 1 showing the auxiliary leashes detached from the primary leash.
Figure 7:
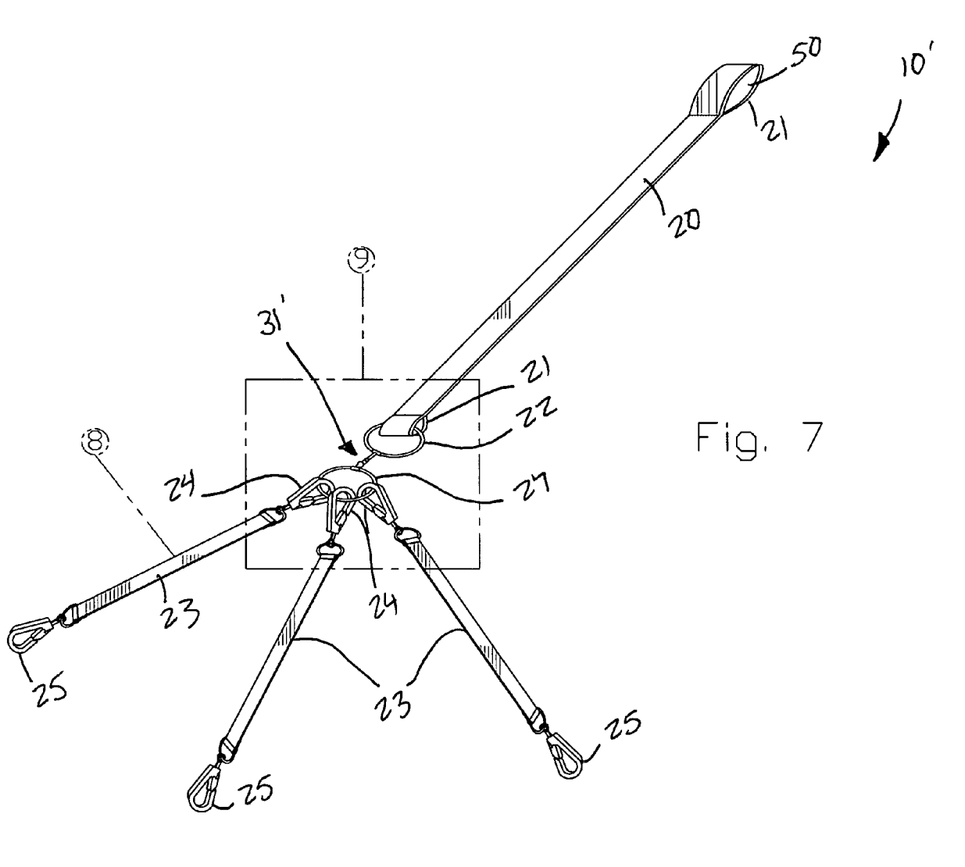
FIG. 7 is a perspective view of the assembly shown in FIG. 1, in an alternate embodiment.
Figure 8:
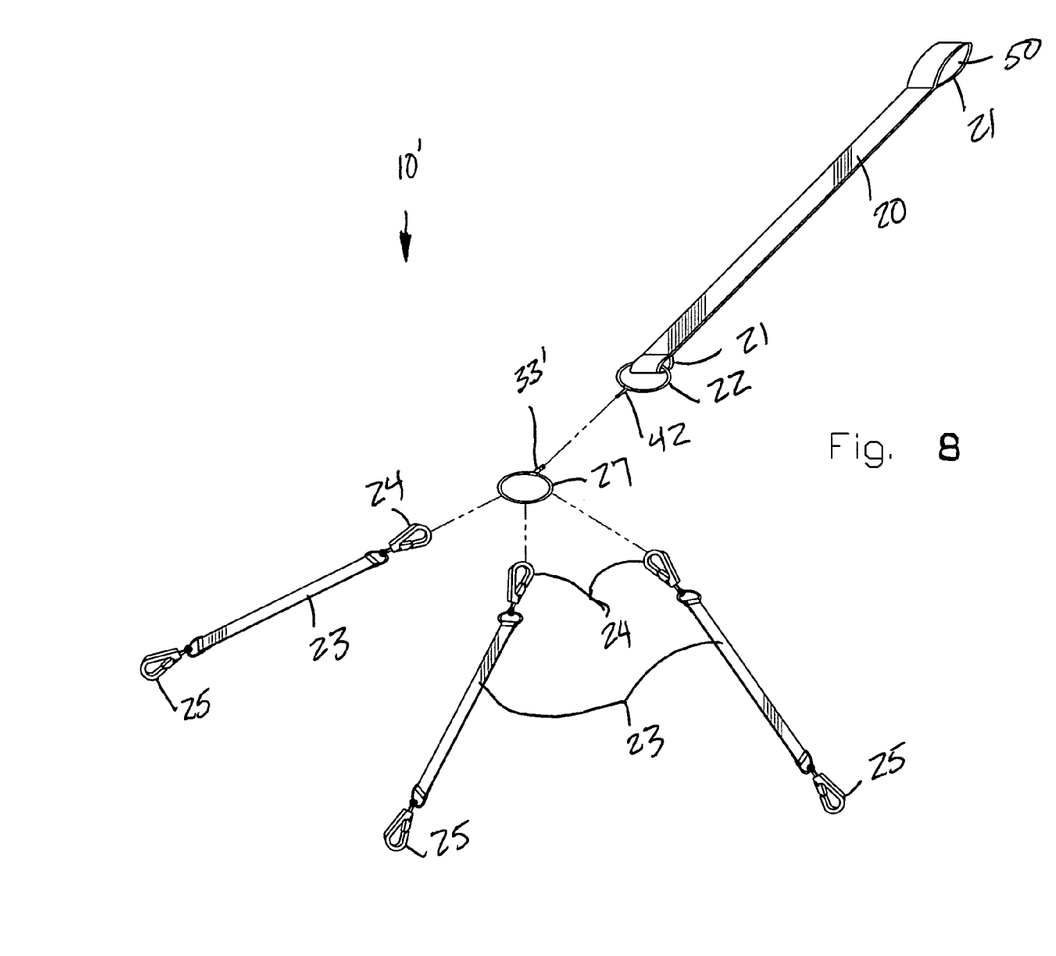
FIG. 8 is a perspective of the assembly shown in FIG. 6, in an alternate embodiment.
Figure 9:
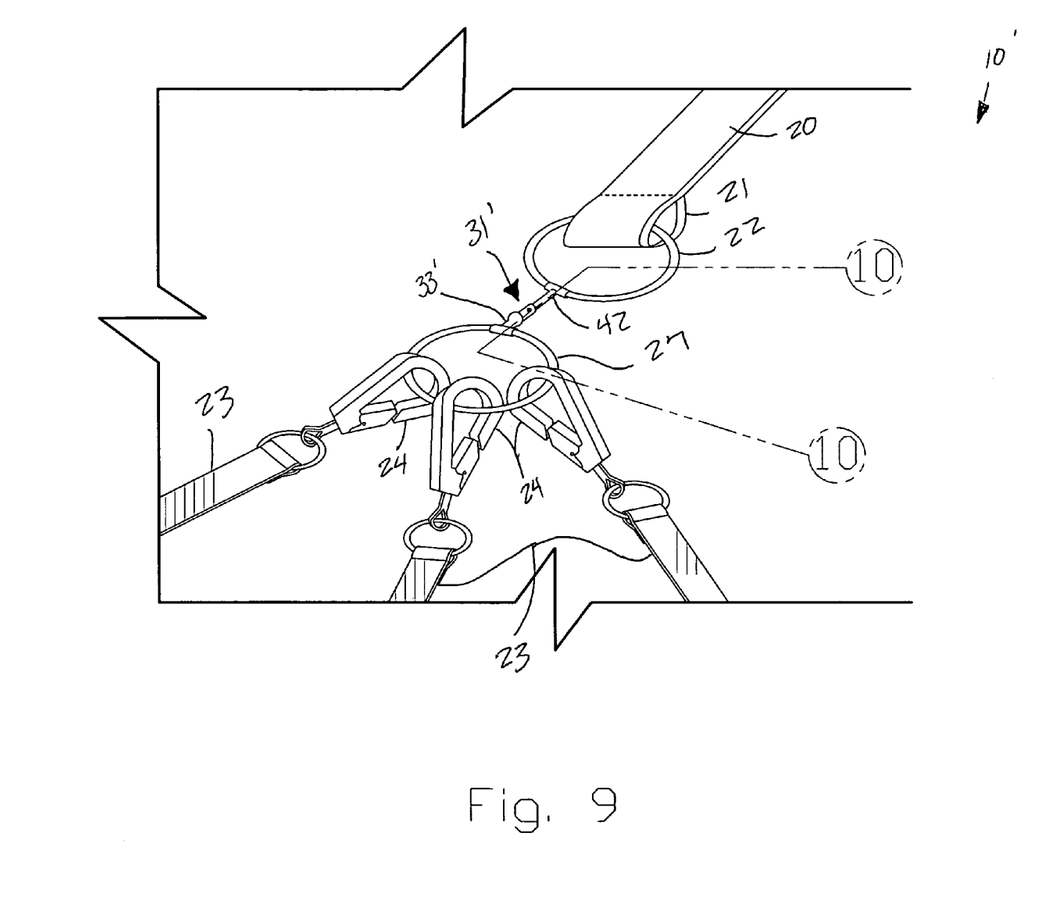
FIG. 9 is an expanded view of the first and second ring members respectively, in an alternate embodiment.
Figure 10:
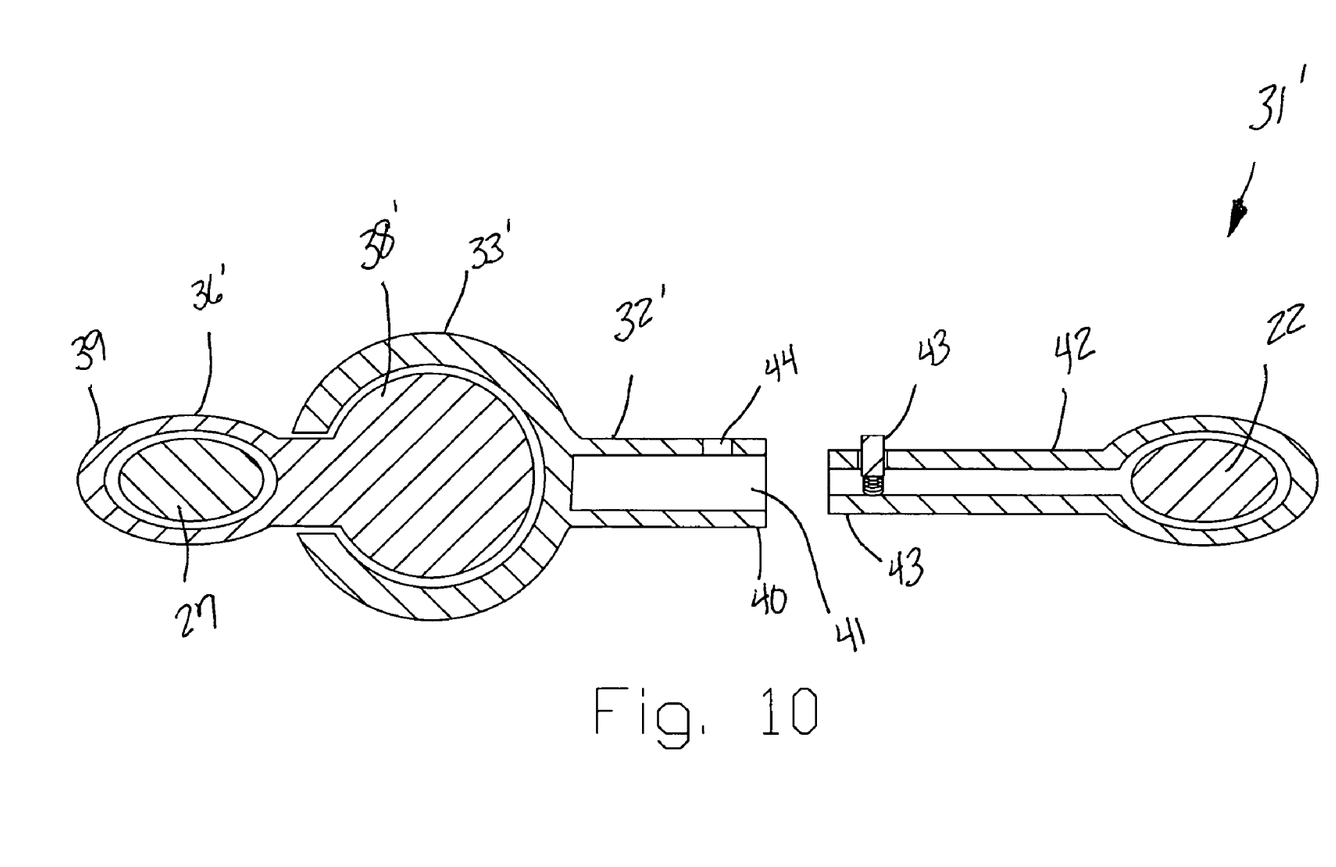
FIG. 10 is a cross sectional view of the first and second ring members shown in FIG. 9, taken along line 10-10.

Referring to FIGS. 9 and 10, the second male coupling 42 further includes a detent 43 formed within the second male coupling 42. The female coupling 32' includes an aperture 44 formed at a top surface thereof, and the detent 43 is aligned with the aperture 44, which is necessary such that the female coupling 32' and the second male coupling 42 advantageously remain statically and fixedly confronted while the first male coupling 36' freely rotates within the hollow distal end 33' of the female coupling 32'. The male and female couplings 36', 42, 32' are slidably positional along a circumference of the first and second ring members 22, 27 respectively. By operating the detent 43 and separating the first and second ring members 22, 27, a user can attach a different primary leash 20 to the second ring member 27 as desired. In addition, a user can replace the second ring member 27 as needed without having to purchase an entire replacement assembly 10 in the event the second ring member 27 becomes damaged or lost.

In use, the pet leash assembly 10 and 10' is simple and straightforward to use. First a user selects and purchases an assembly 10 and 10' according to color preference. The user then clips one end of an auxiliary leash 23 onto each pet collar 12 and then clips the other end onto the second ring member 27. With a firm hold on the handle 50 of the primary leash 20, the user and the pets 11 are ready to begin a walk. During the walk, the user controls the pets 11 with simple tugs and pulls of the primary leash 20, while the rotatable anchoring mechanism 31 prevents the animals 11 from becoming tangled during the walk.

The ability of the second ring member 27 to freely rotate about the male coupling 36, combined with the ability of the auxiliary leashes 23 to travel along the second ring member 27, provides the unexpected benefit of allowing a user to attach a plurality of pets 11 to the assembly 10 in a manner that allows the pets 11 freedom of movement without becoming tangled during walking conditions. In addition, the operation of the detent 43 allows a user to replace the existing primary leash 20 with another as desired, and to replace the second ring member 27 as needed without having to purchase an entire new assembly 10. The above-noted benefits overcome the previously mentioned prior art shortcomings.

A method for simultaneously maintaining a plurality of pets 11 at an untangled position during walking conditions includes the steps of providing a primary leash 20 that has axially opposed looped ends 21, providing a first ring member 22 slidably conjoined directly to one of the looped ends 21, without the use of intervening elements, providing a plurality of auxiliary leashes 23 including first 24 and second 25 locking members positioned at opposed ends 26 thereof, directly and removably mating a second ring member 27 with a first one 24 of the locking members 24, 25 associated with each of the auxiliary leashes 23, without the use of intervening elements, and rotatably anchoring the first and second ring members 22, 27 in such a manner that the auxiliary leashes 23 remain spaced apart along unique travel paths while the pets 11 cross over an adjoining one of the travel paths during walking conditions. The auxiliary leashes 23 are independently removable from the second ring member 27 while the locking members 24, 25 remain spaced from the first ring member 22 during walking conditions. The second ring member 27 is freely rotatable along clockwise and counter clockwise directions defined about a fulcrum axis 30 extending parallel to a longitudinal length of the primary leash 20.

The method further includes, in a preferred embodiment, the steps of providing a female coupling 32 that has a distal end 33 concentrically mated to the second ring member 27. Such a female coupling 32 has a hollow chamber 34 formed at a proximal end 35 thereof and has a smooth interior surface. The steps further include providing a male coupling 36 directly mated to the first ring member 22, without the use of intervening elements, and extending distally away therefrom. Such a male coupling 36 has a spherical distal end 37 freely and rotatably seated within the chamber 34 and cooperating therewith such that the female coupling 32 glides about the spherical end 37 of the male coupling 36 while the first ring member 22 remains statically aligned at a fixed position with the primary leash 20.

The method further includes, in an alternate embodiment, the steps of providing a first male coupling 36' that has a spherical proximal end 38 and further has a hollow distal end 39 slidably positioned along the second ring member 27, providing an intermediately disposed female coupling 32' that has a spherical and hollow distal end 33' rotatably positioned about the spherical end 38' of the first male coupling 36' such that the first male coupling 36' and the female coupling 32 are freely rotatable about each other, and providing a second male coupling 42 slidably positional along the first ring member 22 and including a linear insert 43 removably interfitted within the linear groove 41 of the female coupling 32. The female coupling 32 further has a chamfered proximal end 40 defining a linear groove 41 therein.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A pet leash assembly for simultaneously maintaining a plurality of pets at an untangled position during walking conditions, said pet leash assembly comprising:
    a primary leash having axially opposed looped ends;
    a first ring member slidably conjoined directly to one of said looped ends;
    a plurality of auxiliary leashes including first and second locking members positioned at opposed ends thereof;
    a second ring member directly and removably mated with a top one of said locking members associated with each of said auxiliary leashes; and
    means for rotatably anchoring said first and second ring members in such a manner that said auxiliary leashes remain spaced apart along unique travel paths while the pets cross over an adjoining one of the travel paths during walking conditions said rotatable anchoring means comprises a first male coupling having a spherical proximal end and further having a hollow distal end slidably positioned along said second ring member, an intermediately disposed female coupling having a spherical and hollow distal end rotatably positioned about said spherical end of said first male coupling such that said first male coupling and said female coupling are freely rotatable about each other, said female coupling further having a chamfered proximal end defining a linear groove therein, and a second male coupling slidably positional along said first ring member and including a linear insert removably interfitted within said linear groove of said female coupling;
    wherein said rotatably anchoring means is freely displaced along an entire circumference of each of said first and second ring members.

2. The pet leash assembly of claim 1, wherein said second ring member is freely rotatable along clockwise and counter clockwise directions defined about a fulcrum axis extending parallel to a longitudinal length of said primary leash.

3. The pet leash assembly of claim 1, wherein said rotatable anchoring means comprises:
    a female coupling having a distal end concentrically mated to said second ring member, said female coupling having a hollow chamber formed at a proximal end thereof and having a smooth interior surface; and
    a male coupling directly mated to said first ring member and extending distally away therefrom, said male coupling having a spherical distal end freely and rotatably seated within said chamber and cooperating therewith such that said female coupling glides about said spherical end of said male coupling while said first ring member remains statically aligned at a fixed position with said primary leash.

4. The pet leash assembly of claim 1, wherein said second male coupling comprises:
    a detent formed within said second male coupling;
    wherein said female coupling includes an aperture formed at a top surface thereof, said detent being aligned with said aperture such that said female coupling and said second male coupling remain statically and fixedly confronted while said first male coupling freely rotates within said hollow distal end of said female coupling.

5. The pet leash assembly of claim 1, wherein said male and female couplings are slidably positional along a circumference of said first and second ring members respectively.

6. A pet leash assembly for simultaneously maintaining a plurality of pets at an untangled position during walking conditions, said pet leash assembly comprising:

a primary leash having axially opposed looped ends;

a first ring member slidably conjoined directly to one of said looped ends;

a plurality of auxiliary leashes including first and second locking members positioned at opposed ends thereof;

a second ring member directly and removably mated with a top one of said locking members associated with each of said auxiliary leashes, said auxiliary leashes being independently removable from said second ring member, said locking members remaining spaced from said first ring member during walking conditions; and means for rotatably anchoring said first and second ring members in such a manner that said auxiliary leashes remain spaced apart along unique travel paths while the pets cross over an adjoining one of the travel paths during walking conditions;

wherein said second ring member is freely rotatable along clockwise and counter clockwise directions defined about a fulcrum axis extending parallel to a longitudinal length of said primary leash;

wherein said rotatable anchoring means comprises a first male coupling having a spherical proximal end and further having a hollow distal end slidably positioned along said second ring;

an intermediately disposed female coupling having a spherical and hollow distal end rotatably positioned about said spherical end of said first male coupling such that said first male coupling and said female coupling are freely rotatable about each other, said female coupling further having a chamfered proximal end defining a linear groove therein; and a second male coupling slidably positional along said first ring member and including a linear insert removably interfitted within said linear groove of said female coupling;

wherein said second male coupling comprises a detent formed within said second male coupling;

wherein said female coupling includes an aperture formed at a top surface thereof, said detent being aligned with said aperture such that said female coupling and said second male coupling remain statically and fixedly confronted while said first male coupling freely rotates within said hollow distal end of said female coupling;

wherein said male and female couplings are slidably positional along a circumference of said first and second ring members respectively;

wherein said rotatably anchoring means is simultaneously displaced along an entire circumference of each of said first and second ring members.

7. The pet leash assembly of claim 6, wherein said rotatable anchoring means comprises:

a female coupling having a distal end concentrically mated to said second ring member, said female coupling having a hollow chamber formed at a proximal end thereof and having a smooth interior surface; and a male coupling directly mated to said first ring member and extending distally away therefrom, said male coupling having a spherical distal end freely and rotatably seated within said chamber and cooperating therewith such that said female coupling glides about said spherical end of said male coupling while said first ring member remains statically aligned at a fixed position with said primary leash.

* * * * *